United States Patent [19]

Lares et al.

[11] 3,906,635
[45] Sept. 23, 1975

[54] DENTAL HANDPIECE

[76] Inventors: Joseph P. Lares, 35 Woodhue Ct., Redwood City, Calif. 94062; Albert J. Lares, 351 Grove St., Portola Valley, Calif. 94025

[22] Filed: Dec. 17, 1973

[21] Appl. No.: 425,540

[52] U.S. Cl. .................................... 32/27; 415/503
[51] Int. Cl.² ........................................ A61C 1/10
[58] Field of Search .................. 32/26, 27; 415/503

[56] References Cited
UNITED STATES PATENTS

| | | | |
|---|---|---|---|
| 3,268,205 | 8/1966 | Allen et al. | 32/27 |
| 3,465,442 | 9/1969 | Baldwin et al. | 32/27 |
| 3,639,074 | 2/1972 | Killick | 415/503 X |

Primary Examiner—Louis G. Mancene
Assistant Examiner—J. Q. Lever
Attorney, Agent, or Firm—Lothrop & West

[57] ABSTRACT

A dental handpiece has a hollow housing enclosing an air turbine rotor including a hollow spindle on which a turbine wheel is centrally disposed. On each side of the wheel are bearing carriers axially abutting the housing, spaced from the interior of the housing side wall and partially defining air chambers. Air under pressure is supplied to the turbine wheel and to the air chambers. Bearing sleeves having openings therein communicating with the chambers are slightly spaced from the spindle in supporting relationship therewith. Thrust washers between the wheel and the bearing carriers provide axial wheel positioning. The hollow spindle carries a chuck for holding a dental tool.

1 Claim, 7 Drawing Figures

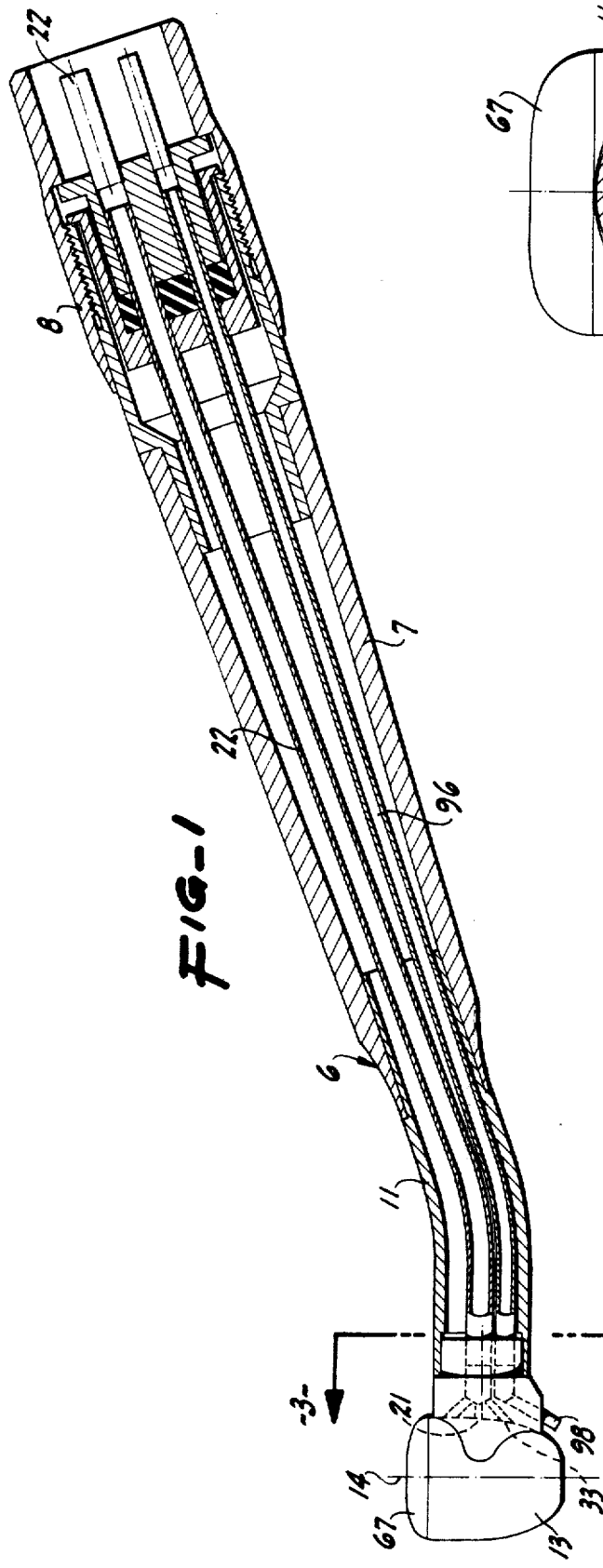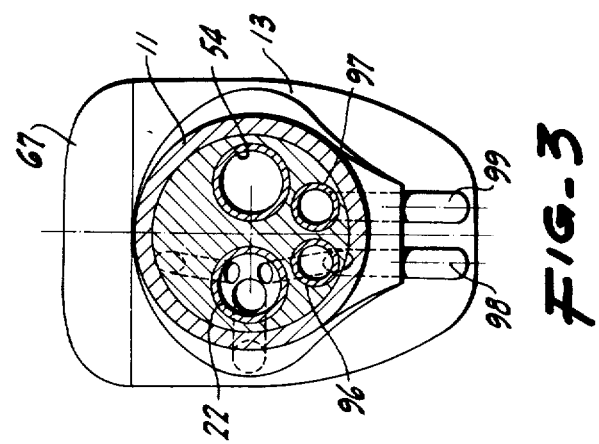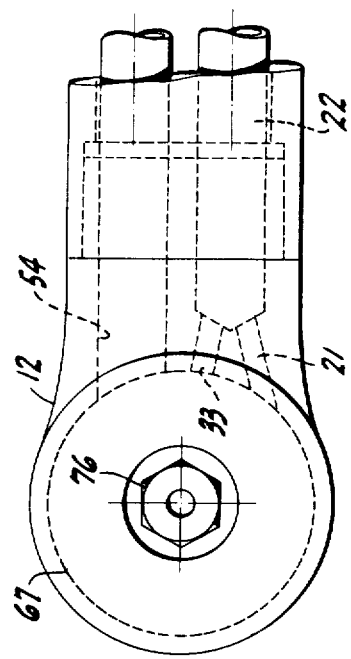

DENTAL HANDPIECE

Our invention relates to means employed by dentists in conducting dental work and is specially concerned with a handpiece effective to operate a dental tool at a very high rate of rotation. A handpiece should be especially vibration free, quiet and effective in a relatively confined space.

It is therefore an object of the invention to provide a dental handpiece that can be fabricated in a relatively small compass for ease of use in the patient's mouth and for precise handling.

Another object of the invention is to provide a dental handpiece that can operate at extremely high speeds of rotation in order to drive appropriate dental tools at high speed.

Another object of the invention is to provide a handpiece in which the rotary parts operate with very little vibration or noise.

A further object of the invention is to provide a dental handpiece in which the motive power, air under pressure, is economically and efficiently utilized.

Another object of the invention is in general to provide an improved dental handpiece.

Other objects, together with the foregoing, are attained in the embodiment of the invention described in the accompanying description and illustrated in the accompanying drawings, in which:

FIG. 1 is for the most part a cross-section on a longitudinal plane showing the construction of the handpiece of the invention;

FIG. 2 is an enlarged view from below of one end of the handpiece;

FIG. 3 is a cross-section to an enlarged scale, the plane of the section being indicated by the line 3—3 of FIG. 1;

In the form of the invention particularly chosen for disclosure herein, there is provided a handpiece, generally designated 6, in which there is a tubular grip portion 7 having at one end a connection 8 for attachment to a supply conduit, not shown, but customarily including air under pressure, water and a conduit for exhaust.

Figure 4:
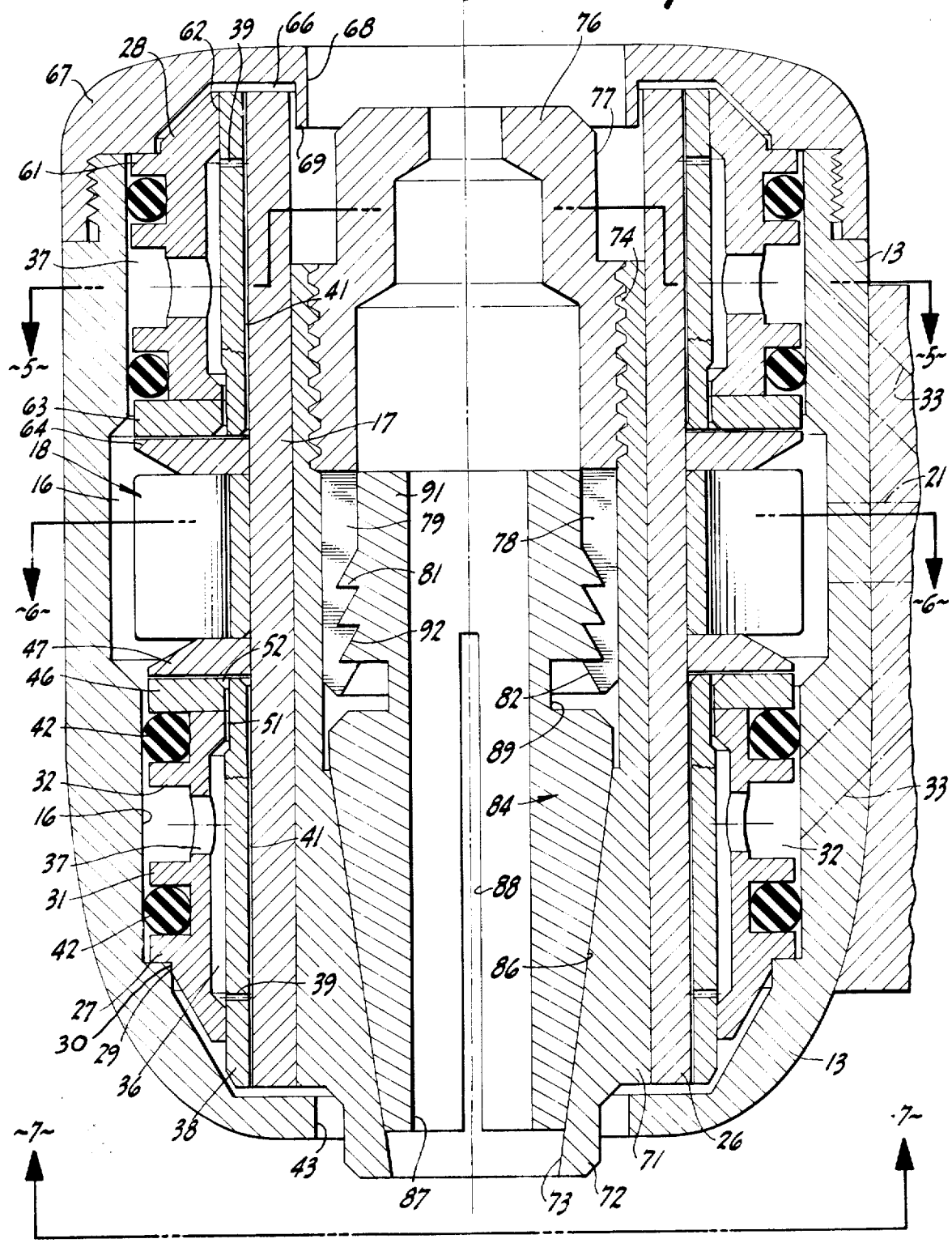
FIG. 4 is a view to a greatly enlarged scale through the head portion of the handpiece shown in FIG. 1, the plane of section being coincident with the rotational axis of the handpiece mechanism.
Figure 5:
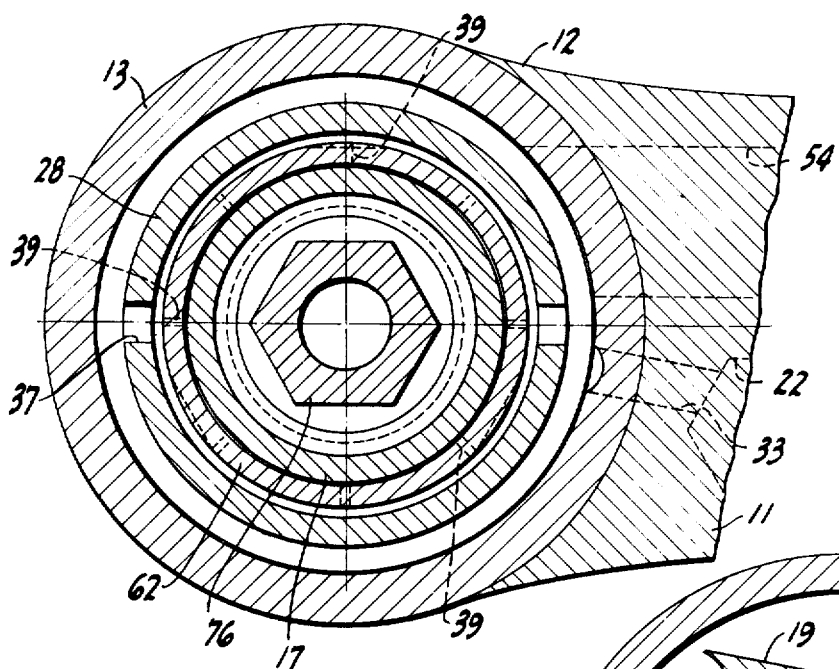
FIG. 5 is a view in cross-section, the plane of which is indicated by the line 5—5 of FIG. 4 and the scale being reduced.
Figure 6:
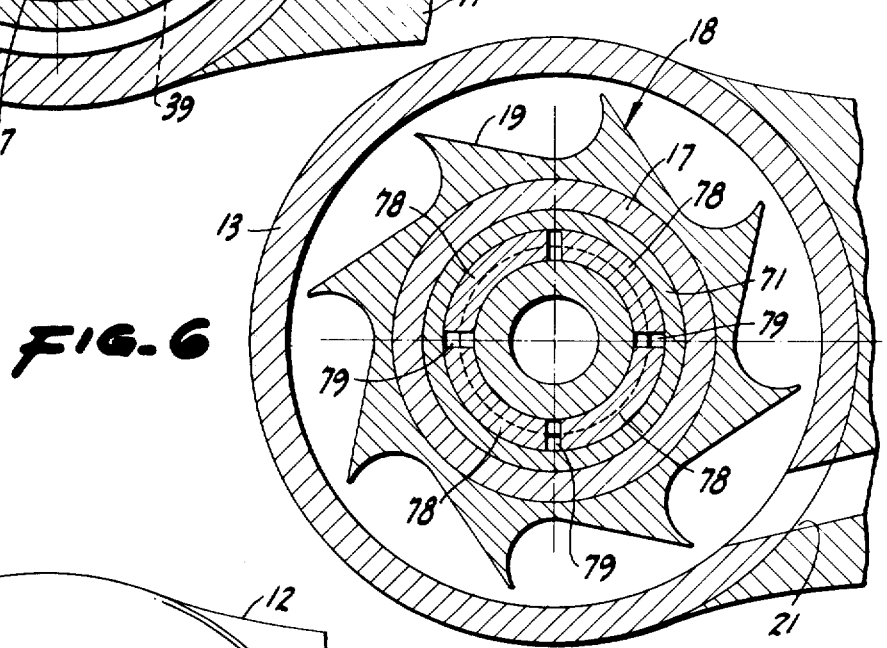
FIG. 6 is a view in cross-section to the scale of FIG. 5 but taken on the line 6—6 of FIG. 4.
Figure 7:
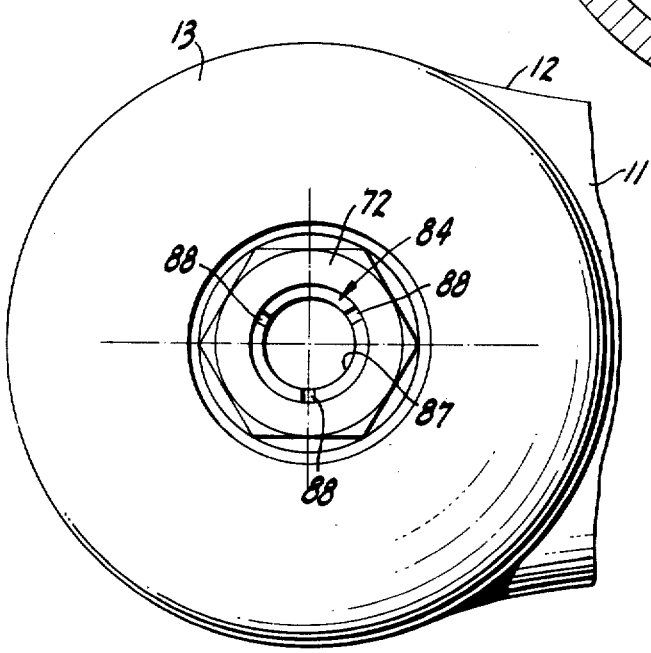
FIG. 7 is a view of the structure of FIG. 4 to the scale of FIGS. 5 and 6 and taken from below.

Adjacent the other end, the grip portion 7 has a specially curved neck 11 of tubular form which makes a smoothly merging junction 12 to a housing 13 generally of circular-cylindrical configuration symmetrical about a central axis 14 (FIG. 4). The housing is a hollow structure enclosing an interior chamber 16 of varying shapes and diameters all symmetrical about the axis 14. Designed to operate within the chamber 16 and about the axis 14 is an air turbine rotor including a hollow spindle 17 and associated parts. Primarily, the rotor includes a turbine wheel 18 mounted on the spindle and having a number of buckets 19 about its periphery. The wheel is arranged in the path of emergence of air under high pressure from a nozzle duct 21 near the periphery of the wheel and connected to a supply tube 22 for air under pressure extending through the grip portion 7 to an appropriate connector 23 within the fitting 8 intended to be joined to a controlled source of pressure air.

The turbine wheel 18 is fast upon the hollow spindle 17, which extends symmetrically about the axis 14 and for approximately the full interior length of the housing 13. The spindle is mounted for high-speed rotation upon appropriate air bearings, one located above the wheel 18 and the other located below the wheel and differing in minor details although generally of the same construction. Included in the air bearings are a lower carrier 27 and an upper carrier 28. The lower carrier, for example, is a generally ring-like body having a flange 29 adapted to seat on a comparable shoulder 30 in the housing and likewise having a peripheral surface 31 that is slightly spaced from the inside wall of the chamber 16. The flange 29 and the shoulder 30 serve accurately to locate the carrier.

The carrier is also formed with a peripheral groove 32 extending entirely around the carrier and in one position, at least, in free communication with a duct 33 for incoming air derived from the supply tube 22 so that the carrier is surrounded with air under pressure. Such air is admitted to an air chamber 36 on the interior of the carrier and around the spindle through a number of openings 37 in the carrier so that the chamber 36 is afforded a full supply of operating air.

Cooperating with the carrier and forming part of the air bearing structure is a lower bearing sleeve 38 of generally thin, cylindrical form pierced at appropriate intervals near the opposite ends thereof by apertures 39. The interior diameter of the bearing sleeves 38 is materially greater than the diameter or the external size of the spindle 17. There is an appreciable space 41 therebetween. Air can flow from the chamber 41 axially into an exhaust opening 43 at one end of the spindle 17.

The chamber 16 at its ends is sealed by O-rings 42 so that the incoming air is axially confined to the chamber 16 on the high pressure side. The O-rings 42 can be of circular cross-section, as shown in FIG. 4, but can also be of rectangular cross-section. In the latter case the so-called "square" O-rings are made sufficiently scant in radial dimensions so that when they are not under air pressure they are free of the circular cylindrical walls of the carrier 27 or 28 and of the chamber 16. Then, when air pressure is impressed upon them they shift slightly in an axial direction and then deform radially firmly to engage the mentioned walls. The tendency of displacing forces then is to put the elastomer of the "square" O-rings in shear, rather than compression, and superior damping of vibration and sound ensues.

While sleeve air bearings are effective to support the spindle in a radial direction, they have no particular function to support the spindle axially. For that reason there is interposed between the lower carrier 27 and the wheel 18 a pair of thrust washers 46 and 47 in fairly close abutment with each other when unloaded but radially spaced from the housing. The washer 47 close to the wheel 18 is a relatively tight fit on the spindle 17 and is in tight abutment with the wheel 18; whereas the washer 46, although in relatively close association with the carrier 27 and readily received on the sleeve 38, may be slightly separated from the washer 47 under load to afford an intervening air bearing.

Air to the thrust bearing is supplied from the chamber 36 through one of several passages 51 provided in the outer surface of the sleeve 38 by appropriate flats thereon. There is provided a clear passageway up to and past the thrust washer 46 and into a beveled annular channel 52 as a local air reservoir. Air traveling radially outwardly from the chamber 41 or from the reservoir 52 through the space between the thrust washers can exhaust into the chamber 16 around the wheel 18. From the wheel chamber there is an exhaust duct 54 leading to an appropriate connection in the connection 1 to a tube carrying the exhaust air away.

In a quite similar fashion the upper portion of the housing contains a carrier 61 having round or "square" O-rings, engaging a sleeve 62 and associated with comparable thrust washers 63 and 64, operating as previously described. From the upper chamber 41 there is afforded an exhaust air flow into a volume 66 partially defined by a removable cap 67 threaded onto and considered as a part of the housing. The cap 67 also has a central opening 68 partially defined by an inturned rim 69 allowing a deflected path of air discharge to the atmosphere and corresponding to the opening 43 at the lower end of the housing.

With the arrangement as so far described, the admission of air under pressure to the tube 22 not only provides a flow of pressure air through the nozzle 21 to impinge upon and rotate the wheel 18, but likewise affords a supply of air through the ducts 33 to the interior of the chamber 16. Pressure air flow is then through openings 37 into the upper and lower chambers 36, from which flow is through passages 39 into the upper and lower spaces 41 between the interior of the bearing sleeves 38 and 62 and the outside of the spindle 17. The air flow is also from the upper and lower chambers 36 through the passages 51 and in between the thrust washers 46 and 47. Air discharge is either to the chamber 16 and to the exhaust or to the atmosphere through the openings 43 or 68.

With this arrangement, the influx of air is effective to rotate the turbine wheel and the spindle at extremely high speeds; that is, speeds of the order of 600,000 revolutions per minute and is effective to suspend the spindle 17, in effect, on radial air bearings between the spindle and the sleeves 38 and 62 and likewise to suspend the spindle axially on air cushions between the thrust washers 46 and 47 in one axial direction and between the washers 63 and 64 in the other axial direction. The arrangement is such that the rotating parts have some freedom to locate themselves because of the air bearings or air cushion support. Furthermore, the O-rings 42 not only act as air seals but also serve as mechanical and sound vibration dampeners and cushions.

To make the rapidly rotating spindle effective in dental work, there is provided within the spindle a particularly designed chuck. This includes a chuck housing 71 which is a tubular member designed to fit closely within and to rotate with the spindle 17. At its lower end the housing 71 has a non-circular, projecting section 72 designed to extend through the opening 43 a short distance. The interior of the housing 71 at one end is given a long, conical, interior surface 73 at a critical angle and at the other end the housing 71 is provided with interior threads 74.

Designed to interengage with the threads 74 are comparable central threads on a head plug 76 having a non-circular upper end 77 and having a plurality of axially extending fingers 78 depending therefrom. The fingers are preferably made integrally with the plug 76 but are separated from each other by a number of radial slots 79 so that the fingers have some springiness. The fingers are generally circular-cylindrical along their outside surfaces but interiorly are provided with notched teeth 81 just above a lower, tapered rim 82.

Designed to cooperate with the head plug 76 is a chuck 84 including a lower portion having a generally conical exterior surface 86 designed approximately to match the conical surface 73 and being hollow to define a central bore 87. The lower portion of the chuck is split into several different jaws by a plurality of axially extending cuts 88. The upper portion of the chuck is separated from the lower portion by a circumferential, rather deep groove 89 and includes a tubular upper part 91 on the outside of which are provided a number of notched teeth 92 complementary to the notched teeth 81.

Before the chuck is introduced into the handpiece housing 13, the two separately made parts 76 and 84 are assembled axially by forcing them together. The notched teeth 81 and 92 spring into each other and interlock. Thereafter these chuck parts cannot be disassembled except by special tools. The assembled chuck is then introduced into the interior of the chuck housing 71 through the opening 68 in the cap 67. The threads 74 are interengaged and, by rotating the chuck through a wrench attached to the non-circular upper end 77 and holding the chuck housing 71 by a wrench attached to the non-circular projecting section 72, the parts are screwed home the surfaces 73 and 86 easily going together concentrically. When the head plug has been screwed far enough along the threads 74, the tapered surface 86 comes into abutment with the tapered surface 73. Thereafter the chuck jaws are squeezed together as the conical portions are forced together. When a tool rotates the non-circular portion 77 in the opposite direction, the associated portion of the entire chuck is moved axially and the critical angle surface 86 is in effect unlocked and moved away from the matching surface 73. The chuck jaws, by their inherent springiness, can spread apart to their initial position with the central bore 87 regaining its initial size. There is thus afforded a gripping and releasing action in the chuck so that a dental tool, such as a burr, having its shank introduced into the bore 87, can be gripped and released as desired. Rotation of the non-circular portion 77 is facilitated by holding the non-circular portion 72. A wrench on both such portions permits the threaded portions 74 to be rotated one part relative to the other.

In many instances during the use of a tool in the chuck it is desired to provide a supply of water for cooling and a supply of air for blowing away contaminants. That is accomplished by affording a pair of tubes 96 and 97 extending through the grip portion 7 from suitable connections in the connection 8 and extending into the head near the housing 13 and discharging through appropriate nozzles 98 and 99.

With a handpiece constructed as described herein, there is afforded a construction in which an air driven turbine can rotate at extremely high speeds because it is supported on air bearings which are virtually frictionless and utilize turbine air with great efficiency. The parts are so arranged that they impart but small vibration to the rotary parts. The mounting in the housing, particularly the O-ring portions, tends to damp out vibratory motion and thus tends to reduce or suppress noise attendant upon the operation of the handpiece. It is found in actual practice that with spindle rotations of the order of 700,000 revolutions a minute the operation of the handpiece is relatively quiet, relatively vibration free and is quite effective to drive the required dental tool.

What is claimed is:

1. A dental handpiece comprising a housing, a lower annular shoulder within said housing and having a first radial flat face and a first cylindrical face, an upper annular shoulder within said housing and having a second radial flat face and a second cylindrical face, said flat faces being opposite each other, an air turbine rotor including a spindle, a turbine wheel disposed on said spindle near the center thereof, a lower air bearing carrier cooperating with said spindle on one side of said wheel and having a flange seated on said first flat face, lower O-rings radially between the outside of said lower air bearing carrier and said housing, a lower bearing sleeve included in said lower air bearing carrier and radially spaced from said spindle, a lower pair of thrust washers axially spaced apart and disposed one on and included in said lower bearing carrier and the other on said spindle against said rotor, an upper air bearing carrier cooperating with said spindle on the other side of said wheel and having a flange seated on said second flat face, upper O-rings radially between the outside of the second bearing carrier and said housing, an upper bearing sleeve included in said upper bearing carrier and radially spaced from said spindle, an upper pair of thrust washers axially spaced apart and disposed one on and included in said upper bearing carrier and the other on said spindle against said rotor, and means for conducting air into and out of spaces between said spindle and said lower and upper bearing carriers and between said thrust washers of said lower pair and of said upper pair.

* * * * *